(12) United States Patent
Broens et al.

(10) Patent No.: US 7,351,335 B2
(45) Date of Patent: Apr. 1, 2008

(54) FILTER MODULE

(75) Inventors: Lute Broens, Markelo (NL); Harry Futselaar, Hengelo (NL); Ingo Blume, Hengelo (NL); Annemieke Bernadette Edmond Mattheeuws, Vriezenveen (NL); Michiel Jan Lensink, Amsterdam (NL); Lucas Johannes Cornelis Kouters, Alphen aan de Rijn (NL); Marc Johannes Fleuren, Utrecht (NL)

(73) Assignee: Norit Proces Technologie Holding B.V., Zenderen (NL)

( * ) Notice: Subject to any disclaimer, the term of this patent is extended or adjusted under 35 U.S.C. 154(b) by 459 days.

(21) Appl. No.: 10/495,736

(22) PCT Filed: Nov. 15, 2002

(86) PCT No.: PCT/NL02/00743

§ 371 (c)(1),
(2), (4) Date: Nov. 10, 2004

(87) PCT Pub. No.: WO03/041847

PCT Pub. Date: May 22, 2003

(65) Prior Publication Data

US 2005/0067340 A1 Mar. 31, 2005

(30) Foreign Application Priority Data

Nov. 15, 2001 (NL) .................................... 1019374

(51) Int. Cl.
*B01D 61/18* (2006.01)
*B01D 63/02* (2006.01)

(52) U.S. Cl. ..................... 210/202; 210/203; 210/205; 210/266; 210/315; 210/316; 210/317; 210/321.69; 210/321.79; 210/409; 210/501; 210/502.1

(58) Field of Classification Search ................ 210/266, 210/315–317, 321.79, 321.8, 321.88, 321.89, 210/433.1, 497.1, 501, 502.1, 202, 203, 205, 210/321.69, 409, 638, 639, 702, 723–727
See application file for complete search history.

(56) References Cited

U.S. PATENT DOCUMENTS 2,304,626 A * 12/1942 Chesson ..................... 252/176

(Continued)

FOREIGN PATENT DOCUMENTS

EP 0 364 111 4/1990

(Continued)

*Primary Examiner*—Matthew O. Savage
(74) *Attorney, Agent, or Firm*—Weingarten, Schurgin, Gagnebin & Lebovici LLP

(57) ABSTRACT

A filter module provided with a housing (3) having an inlet (6) for a liquid to be filtered and an outlet (10) for filtered liquid, with a first filter element (7-9, 12) accommodated in the housing (3), in the form of a porous mass provided with a central through-opening, to which the inlet (6) connects, and with a second filter element (1) accommodated in the housing (3) in the form of a number of lengths of tube-shaped filtering membrane (2), which together define a cylinder shape, which cylinder shape, at at least one extremity, between the open-ended filter membranes (2), is filled up with a sealing material, to which extremity the outlet (10) connects. The inlet (6) connects to the central through-opening of the first filter element (7-9, 12), which is surrounded by the second filter element (1), which has the form of a tubular casing obtained by winding from tube-shaped filtering membrane (2).

23 Claims, 2 Drawing Sheets

U.S. PATENT DOCUMENTS 3,422,008 A    1/1969   McLain
3,455,460 A    7/1969   Oldershaw et al.
5,897,729 A    4/1999   Nicolas, Jr. et al.

FOREIGN PATENT DOCUMENTS

| | | |
|---|---|---|
| EP | 0 970 738 | 1/2000 |
| JP | 56 087405 | 7/1981 |
| JP | 04 322783 | 11/1992 |
| JP | 07 031971 | 2/1995 |
| JP | 07 047240 | 2/1995 |
| JP | 2000 079390 | 3/2000 |
| WO | WO 01 07151 | 2/2001 |
| WO | WO 01 66238 | 9/2001 |

* cited by examiner

FILTER MODULE

This application is a 371 national phase filing of PCT/NL02/00743 filed Nov. 15, 2002, and claims priority to a Dutch application No. 1019374 filed Nov. 15, 2001.

The invention relates to a filter module provided with a housing having an inlet for a liquid to be filtered and an outlet for filtered liquid, with a first filter element accommodated in the housing, in the form of a tubular porous mass provided with a central, through-opening, to which the inlet connects, and with a second filter element accommodated in the housing, in the form of a number of lengths of hose-shaped filter membrane, together defining a cylinder shape, which cylinder shape is filled up with a sealing material at at least one extremity between the filter membranes terminating open there, to which extremity the outlet connects.

Such a filter module is known from the non-prepublished international patent application WO 02/36248. There, the second filter element is formed by a bundle of lengths of filter membrane extending straight and mutually parallel to each other. The thus obtained rod-shaped second filter element is placed in the central through-opening in the first filter element, which, in turn, enclosing an annular space, is surrounded by the housing of the filter module. The inlet for liquid to be filtered is connected to the annular space, which must ensure that the liquid to be filtered can penetrate into the first filter element along the entire height thereof After the initial filtering in the first filter element, the liquid to be filtered ends up in the central through-opening where the second filter element is located. The liquid is to penetrate through the wall of the filter membranes and thereupon to flow to open ends thereof, to be thus allowed, via the outlet, to leave the filter element as filtered liquid.

First forming the second filter element from parallel lengths of filter membrane and then placing it in the central through-opening of the first filter element is a cumbersome and time-consuming task that does not lend itself to mechanization. Further, when placing the first and the second filter element in the housing, not only should it be provided that, each time, an annular space be present between the first filter element and the housing, but also the assembly should be such that the passage of the annular space, viewed circumferentially, is and remains the same everywhere, even if the filter module is placed in an inclined or horizontal position.

The object of the invention is to remedy the above-mentioned problems and, in particular, to provide a filter module which can be manufactured mechanically as much as possible.

This is achieved in accordance with the invention with a filter module of the type described in the opening paragraph, in that the inlet connects to the central through-opening of the first filter element, which is surrounded by the second filter element, which has the form of a tubular casing obtained through winding from hose-shaped filtering membrane. By virtue of these features, whereby, for one thing, the first and second filter element have exchanged places, a uniform supply of liquid to be filtered to the first filtering body is always guaranteed by situating that supply in the central through-opening. As a result, the passage of the supply no longer depends on two initially separate elements which must be assembled in the proper manner and must remain in place, but this passage is formed by simply providing a central channel in a single element. By providing the second filter element around the first filter element, it can be manufactured, due to its thus obtained tubular shape, in an advantageous and mechanical manner by means of winding around a core. That core may be the first filter element or a different part, lost or not lost. As the mechanically manufactured, tubular second filter element can have its own form rigidity, the first filter element can be brought at its central position, at will, before or after the winding of the second filter element, all this depending on the materials used and the manner of forming selected.

With respect to the known module, a thus formed filter module has an additional, advantageous effect, viz. a more uniform, i.e. more complete flow-through of the filter module, because, as a result of a more favorable pressure build-up in the filter membranes, the liquid to be filtered is taken up and dispensed by the filter membranes in a better distributed manner.

As the first filter element is present in the space enclosed by the second filter element, it is further possible, in an advantageous manner, that the porous mass consists of a powdered or granular mass. Naturally, it is also possible that the porous mass consists of a form-retaining body, which is either slid into the tubular casing after the formation thereof or can serve as a winding core for forming the tubular casing.

The ease of manufacture and the freedom of manufacture also offer the possibility of utilizing a multiplicity of materials, depending on the desired use and properties of the filter module. For instance, the porous mass of the first filter element can consist of a filtering material, an absorbent and/or a different component, while the absorbent can be selected from a group consisting of activated carbon, zeolites, clay materials or combinations thereof, while the other component can be selected from a group formed by compounds having a controlled release of active substances, pH regulating substances, ion exchanging substances, scavengers, or a combination thereof. The active substances mentioned can then be selected from a group consisting of minerals, iodide, disinfectants or a combination thereof. The second filter element can then consist of filter membranes selected from a group comprising microfiltration membranes, ultrafiltration membranes, nanofiltration membranes, reversed osmosis membranes, hydrophilic membranes and/or membranes to which adsorption agents or bacteriostats have been added.

In a further advantageous manner, the properties of the filter module can then be relatively simply increased and adjusted, if in the tubular casing of the second filter element through winding at least one further length of hollow or not hollow threadlike material, woven or non-woven, is incorporated. An option to be considered here is for the at least one further length to be selected from a group comprising reinforcement threads, deaeration or aeration membranes, such as a hydrophobic membrane, heat exchanging channels, heating wire for the purpose of sterilization, channels for the supply of additives and/or materials having a bacteriostatic action.

If it is intended to form the first filter element from powder-shaped or grain-shaped material, it may be preferred that the winding into a tubular body is effected by providing a number of winding layers on a liquid permeable hollow support body which forms a lost core, so that a boundary for the intended material can be created. As a support body, a perforated tube can be selected or at least one layer of woven or non-woven fibers or different filtering material or a combination thereof. Thus, the form stability of the filter module formed can be promoted which has its advantages as a shaping means for the first filter element. In addition, in this manner, the properties of the filter module and its action can be further influenced and improved.

When, in accordance with a further embodiment of the invention, between the windings of the tubular casing, material is present which can cause the formation of calcium crystals, and a part of the housing surrounding the tubular casing is provided with an inlet and an outlet for flush water, the filter module can be advantageously deployed as a water softening apparatus. The calcium crystals forming between the filtering membranes can be flushed away periodically by having flush water run between the filtering membranes via the inlet and outlet provided to that end. This has partly been made possible in a relatively easy manner by placing the second filter element at the outside.

If so desired, it may be provided that the central through-opening in the first filter element at both end faces connects to an inlet for a liquid to be filtered. It is also possible to close off either of the exits and to use it as a draining point for a vertically disposed filter module.

It is also possible that the tubular casing is provided at both ends with open-ended filtering membranes with surrounding spaces filled up with sealing material, allowing the filtered liquid to be optionally withdrawn from the filter module at both ends.

A filter module according to the invention is widely employable for filtering liquids and gases such as aqueous liquids or different solvents. The filter module is, for instance, highly suitable to be used in households, but can also be deployed in industrial purification, waste water processing, protection against legionnaires' disease or other microorganisms, water purification for outdoor sports and calamities, desalination of sea water, purification of beer, wine and other foods, products for special applications ("dedicated products"), such as components and consumer goods in appliances, for instance coffee machines, medicinal applications, diet beverages, etc.

The filter module is highly suitable for a method wherein it is flowed through with a liquid to be filtered, such as tap water, surface water, mineral water, waste water, sea water, or a beverage. Thus, in a very efficient manner, a highly purified liquid can be obtained which can serve as an end product or as a base material for a different product.

With reference to embodiments represented in the drawings, albeit exclusively by way of non-limitative examples, the filter module according to the invention will now be further discussed.

IN THE DRAWING

Figure 1:
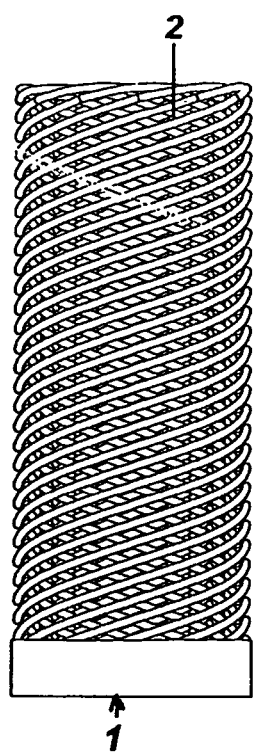
FIG. 1 shows, in elevation, a wound, tubular second filter element, which is potted on one side.

In FIG. 1, a second filter element 1 is represented, obtained by winding at least one endless, tube-shaped filtering membrane 2 on a cylindrical base body (not shown). The filtering membrane 2 can be selected from a group comprising microfiltration membranes, ultrafiltration membranes, nanofiltration membranes, reversed osmosis membranes and/or membranes to which adsorption agents or bacteriostats have been added. By winding back and forth and building up a number of layers comparable to the manner in which a bobbin of thread is formed, a tubular casing having an inherent form stable construction can be obtained. Winding can then be carried out depending on the desired degree of packing of the filtering membranes 2. The cylindrical base body can be a core to be removed after finishing of the winding, but also a hollow lost core with a perforated wall structure can be selected. The filtering membrane 2 can be wound directly onto the core, but, if desired, it is also possible, depending on the eventual intended use, first to apply a number of layers of material with filtering properties onto the (lost) core.

The thus obtained winding body having at its two extremities uninterrupted, continuous layers of filtering membrane 2 is then potted at one extremity for obtaining the second filter element shown in FIG. 1, i.e. at that extremity, in the spaces between the windings of filtering membrane, over a relatively short axial length of the winding body, a filling and sealing material is provided which penetrates into, but not through the wall material of the capillary filtering membrane 2, so that the free passage of the filtering membrane remains open. As a filling material, an initially flowable but thereupon curing material is selected, such as an epoxy resin, a polyurethane resin, a "hot melt" resin or a combination of like and similar resins. This potting can be carried out by dipping the winding body into a liquid bath over the desired axial length. However, it is preferred that the winding body is slid into a cylindrical holder, which thus defines the outer circumferential surface of the filling material. The application of the filling material can again be carried out by dipping the winding body into a liquid bath, placed in the cylindrical holder. Applying the filling material in a more controlled manner can be effected by sealing the cylindrical holder at one extremity and by supplying a measured amount of filling material through the open core from the other open extremity.

After thus potting one extremity of the winding body, a disc-shaped part thereof is cut off, which disc-shaped part has a thickness such that the uninterrupted windings of filtering membrane at the extremity are cut through and away, so that a large number of open connections between the windings of filtering membrane and the surroundings are created.

In this way, the second filter element 1 shown in FIG. 1 is obtained, which is provided with uninterrupted, continuous windings of filtering membrane 2 at one extremity and with windings of filtering membrane open towards the surroundings at the other extremity. Such a second filter element 1 can be used in a filter module with a so-called dead-end configuration, which will be further elucidated with reference to FIG. 2.

Figure 2:
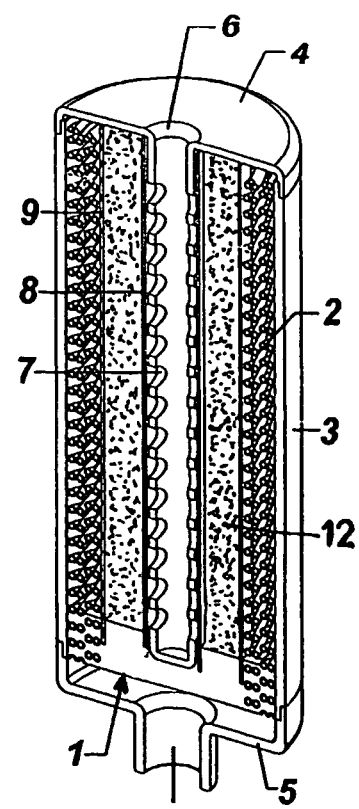
FIG. 2 shows, in sectional perspective elevation, a filter module in which a second filter element according to FIG. 1 has been accommodated.

The filter module shown in FIG. 2 comprises a second filter element 1, placed in a cylindrical holder 3, which, for instance, can be the cylindrical holder used when potting. At its one extremity, the cylindrical holder 3 is closed by an inlet cover 4, and at its other extremity by an outlet cover 5. The inlet cover 4 is provided with an inlet 6 to which a perforated inlet tube 7 connects, which extends into the filling material present near the outlet cover 5. This indicates that the perforated tube 7 was already present within the winding body during potting. However, such a perforated tube can also be provided after potting, in which case it terminates above the filling material. Around the perforated tube 7, a layer 8 of woven or non-woven fibers or different filtering material has been provided and, in radial direction and at a distance from that layer, a further layer 9. Between the layers 8 and 9, filter material 12 is present, for instance activated carbon, with the assembly 7-9 with filling 12 forming a first filter element. The first filter element could have served as a lost core during winding or could have been slid into the hollow core of the winding body after winding, before or not before potting. The outlet cover 5 is provided with an outlet 10 and leaves a space clear below the winding body with opened filtering membranes.

A fluid to be filtered is supplied to the inlet 6 and, distributed, is pressed through the perforated tube 7 via the layer 8, the filling 12 and the layer 9 to the filtering membranes 2. The only way out for the fluid to be filtered is to penetrate through the wall material of the filtering membranes 2 and to flow via the open passage of the filtering membranes 2 in the direction of the open extremities thereof The thus filtered material ends up in the clear space of the outlet cover 5 and then leaves the filter module via the outlet 10.

The perforated tube 7 forms an open passage, which yields a favorable pressure drop across the filter module.

Figure 3:
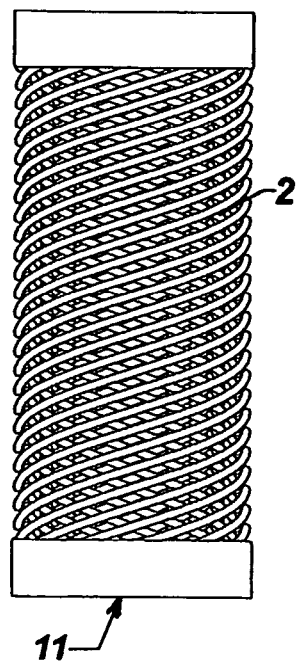
FIG. 3 shows, in elevation, a wound, tubular second filter element, which is potted on two sides.

In FIG. 3, a second filter element 11 is represented, comprising a winding body formed from a filtering membrane 2, which can be obtained through winding in a manner described with reference to FIG. 1. The winding body is potted two-sidedly, which, again, is done by a procedure described with reference to FIG. 1, whereupon, at both extremities, a disc-shaped part has been removed such that at both extremities filtering membranes opening towards the surroundings have been obtained. Such a second filter element 11 can be used in a filter module having an inlet and an outlet at both the top side and the bottom side, as will be further elucidated with reference to FIG. 4.

Figure 4:
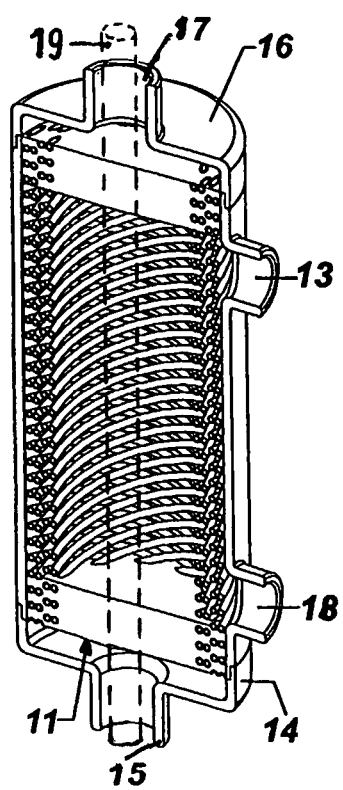
FIG. 4 shows, in sectional perspective elevation, a filter module in which a second filter element according to FIG. 3 has been accommodated.

The filter module shown in FIG. 4 comprises a second filter element 11 received in a cylindrical holder provided with a flush water inlet 13 and a flush water outlet 18. At the one extremity, the cylindrical holder is closed off by a cover 14 with outlet 15 and at the other extremity by a cover 16 with outlet 17. The covers 14 and 16 are designed such that a free space is created on opposite sides of the second filter element 11. The two inlets are formed by a tube 19 indicated by a broken line, which is of perforated design between the two potted parts of the second filter element. Around the tube 19, in the space surrounded by the second filter element 11, a first filter element is present which is not represented for reasons of clarity.

A fluid supplied via the inlet tube 19 will start to flow via the perforations through the first filter element (not shown) and be filtered, whereupon a second filtering takes place during the penetration through the wall material of the filtering membranes 2. The thus filtered fluid can leave the filter module via the discharges 15 and 17. During this filtering process, the inlet 13 and the outlet 18 are closed off. In this embodiment of the filter module, a substance can be present between the filtering membranes which forms calcium crystals, with which the filter module can be used as a water softener. It is then preferred that the calcium crystals be removed periodically to keep the softening action optimal. This can be realized by flushing out the spaces between the filtering membranes by supplying flush water, via the inlet 13 and thus generating a flow between the filtering membranes, so that the calcium crystals are carried along and removed with the rinsing water from the second filter element 11 via the outlet 18, so that a filter module with cleaning action is obtained.

Figure 5:
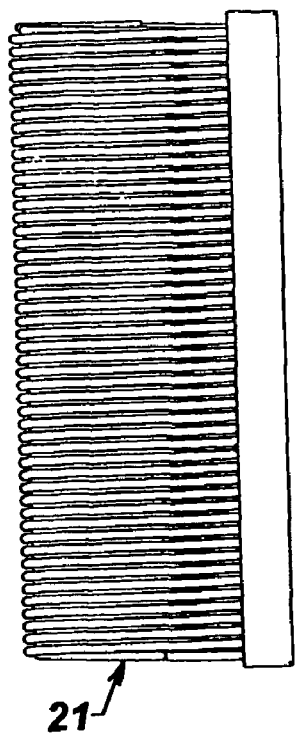
FIG. 5 shows, in elevation, a wound, tubular second filter element, which is potted locally, over its full length, in axial direction.
Figure 6:
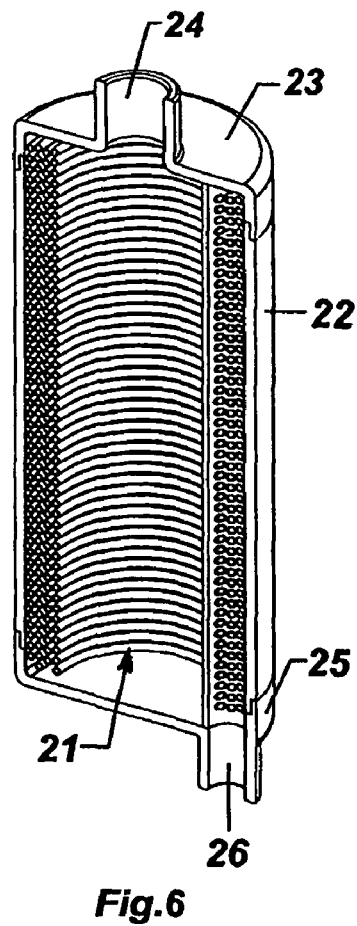
FIG. 6 shows, in sectional perspective elevation, a filter module in which a second filter element according to FIG. 1 has been accommodated.

In FIG. 5, a second filter element 21 is represented which is provided with a winding body obtained by winding at least one filter membrane 2 at a limited pitch on a cylindrical holder. Next, the winding body has been potted by filling up the spaces between the windings in an area extending in axial direction over a limited circumferential area with filling material, for instance by dipping the winding body in a liquid bath. By subsequently removing a part of the filling material again, this in a manner such that a large number of windings is cut through, the filtering membranes are placed in open communication with the surroundings. Removing the filling material can be carried out by cutting a chop from the winding body over its full length, which chop, in cross section, has the form of a segment of an arc. In addition, also, milling or cutting a groove or slot can be considered, or drilling a passage. Thus, a second filter element is obtained which can be utilized in a filter module having a dead-end configuration, as will be discussed further with reference to FIG. 6.

The second filter element 21 is placed in a cylindrical holder 22, which is sealed off at one extremity by a cover 23 with a central inlet 24 and, at the other extremity, by a cover 25 with an outlet 26 which connects to a recess formed by removing filling material for the purpose of opening the filtering membranes 2 towards the surroundings. In the space enclosed by the second filter element 21 and the covers 23 and 25, another first filter element is accommodated, not represented for reasons of clarity, having a central passage opening.

Fluid supplied via the inlet 24 will first penetrate through the central through-opening and the surrounding filtering material of the first filter element and then penetrate the filtering membranes 2 and thus be filtered. Via the filtering membranes 2, the filtered fluid will end up in the outlet 26 and be discharged from the filter module.

It is self-evident that within the framework of the invention as laid down in the accompanying claims, many modifications and variations are possible. For instance, in the flush system, the inlet and the outlet can be exchanged. Each time, a cylindrical winding body of a circular cross section has been represented. This cross section can also be oval or multi-angular. Further, in all manners of winding represented, a single endless filtering membrane can be used or several filtering membranes, which are provided simultaneously or in succession. Winding can be carried out in parallel, cross-wise or woven fashion, and, if desired, other elongated elements can be wound along.

The invention claimed is:

1. A filter module comprising:
   a housing having an inlet for a liquid to be filtered and an outlet for filtered liquid;
   a first filter element accommodated in the housing, in the form of a tubular porous mass provided with a central through-opening, to which the inlet connects; and
   a second filter element accommodated in the housing comprising a number of lengths of tube-shaped filtering membranes formed as a winding into a tubular casing surrounding the first filter element and defining a cylinder shape having opposed extremities, a sealing material disposed at least at one extremity between the filtering membranes to terminate openings at the extremity between the filtering membranes, the outlet connected through the extremity; and
   wherein material is present between the windings of the tubular casing that can cause the formation of calcium crystals from the liquid to be filtered, and a part of the housing surrounding the tubular casing is provided with an inlet and an outlet for flush water.

2. A filter module according to claim 1, characterized in that the porous mass comprises a mass of powder or a mass of grains.

3. A filter module according to claim 2, characterized in that the porous mass of the first filter element comprises filtering material or an absorbing agent.

4. A filter module according to claim 2, characterized in that the porous mass of the first filter element comprises an absorbing agent selected from a group consisting of activated carbon, zeolites, clay materials and combinations thereof.

5. A filter module according to claim 4, characterized in that the porous mass of the first filter element further comprises a component selected from a group consisting of compounds with a controlled release of active substances, pH regulating substances, ion exchanging substances, scavengers, and a combination thereof.

6. A filter module according to claim 2, characterized in that the porous mass of the first filter element comprises a component selected from a group consisting of compounds with a controlled release of active substances, pH regulating substances, ion exchanging substances, scavengers, and a combination thereof.

7. A filter module according to claim 6, characterized in that said active substance is selected from a group consisting of minerals, iodide, disinfectants and a combination thereof.

8. A filter module according to claim 1, characterized in that the porous mass comprises a form retaining body.

9. A filter module according to claim 8, characterized in that the porous mass of the first filter element comprises a filtering material or an absorbing agent.

10. A filter module according to claim 1, characterized in that the second filter element comprises filtering membranes selected from a group consisting of microfiltration membranes, ultrafiltration membranes, nanofiltration membranes, reversed osmosis membranes, hydrophilic membranes and membranes to which absorption agents or bacteriostats have been added.

11. A filter module according to claim 1, characterized in that in the tubular casing of the second filter element, through winding, at least a further length of hollow or not hollow thread-shaped material is included, woven or not woven.

12. A filter module according to claim 11, characterized in that the at least one further length is selected from a group consisting of reinforcement wires, deaeration or aeration membranes, such as a hydrophobic membrane, heat exchanging channels, heating wire for the purpose of sterilization, channels for the supply of additives, and materials having a bacteriostatic action.

13. A filter module according to claim 1, characterized in that the tubular casing is wound on a liquid permeable hollow support body.

14. A filter module according to claim 13, characterized in that the support body is a perforated tube.

15. A filter module according to claim 14, characterized in that between the perforated tube and the tubular casing, at least one layer of woven or non woven fibers is provided.

16. A filter module according to claim 13, characterized in that the support body is at least one layer of woven or non woven fibers.

17. A filter module according to claim 1, characterized in that the central through-opening in the first filter element connects at both end faces to an inlet for a liquid to be filtered.

18. A filter module according to claim 1, characterized in that the tubular casing is provided at both extremities with open-ended filter membranes with surrounding spaces filled up with sealing material.

19. A filter module according to claim 1, characterized in that the porous mass comprises both a form retaining body and one of a mass of powder or a mass of grains.

20. A filter module according to claim 19, characterized in that:
the porous mass of the first filter element comprises a filtering material or an absorbing agent;
the absorbing agent is selected from a group consisting of activated carbon, zeolites, clay materials and combinations thereof;
the porous mass of the first filter element further comprises a component selected from a group consisting of compounds with a controlled release of active substances, pH regulating substances, ion exchanging substances, scavengers, and a combination thereof; and
said active substance is selected from a group consisting of minerals, iodide, disinfectants and a combination thereof.

21. A filter module according to claim 20, characterized in that the second filter element comprises filtering membranes selected from a group consisting of microfiltration membranes, ultrafiltration membranes, nanofiltration membranes, reversed osmosis membranes, hydrophilic membranes and membranes to which absorption agents or bacteriostats have been added.

22. A filter module according to claim 21, characterized in that:
in the tubular casing of the second filter element, through winding, at least a further length of hollow or not hollow thread-shaped material is included, woven or not woven;
the at least one further length is selected from a group consisting reinforcement wires, deaeration or aeration membranes, such as a hydrophobic membrane, heat exchanging channels, heating wire for the purpose of sterilization, channels for the supply of additives, and materials having a bacteriostatic action;
the tubular casing is wound on a liquid permeable hollow support body;
the support body is one of a perforated tube and at least one layer of woven or non woven fibers;
between the perforated tube and the tubular casing, at least one layer of woven or non woven fibers is provided;
the central through-opening in the first filter element connects at both end faces to an inlet for a liquid to be filtered; and
the tubular casing is provided at both extremities with open-ended filter membranes with surrounding spaces filled up with sealing material.

23. A filter module according to claim 20, characterized in that:
in the tubular casing of the second filter element, through winding, at least a further length of hollow or not hollow thread-shaped material is included, woven or not woven;
the at least one further length is selected from a group consisting of reinforcement wires, deaeration or aeration membranes, such as a hydrophobic membrane, heat exchanging channels, heating wire for the purpose of sterilization, channels for the supply of additives, and materials having a bacteriostatic action;

the tubular casing is wound on a liquid permeable hollow support body;

the support body is one of a perforated tube and at least one layer of woven or non woven fibers;

between the perforated tube and the tubular casing, at least one layer of woven or non woven fibers is provided;

the central through-opening in the first filter element connects at both end faces to an inlet for a liquid to be filtered; and the tubular casing is provided at both extremities with open-ended filter membranes with surrounding spaces filled up with sealing material.

* * * * *

UNITED STATES PATENT AND TRADEMARK OFFICE
CERTIFICATE OF CORRECTION

| | |
|---|---|
| PATENT NO. | : 7,351,335 B2 |
| APPLICATION NO. | : 10/495736 |
| DATED | : April 1, 2008 |
| INVENTOR(S) | : Lute Broens et al. |

It is certified that error appears in the above-identified patent and that said Letters Patent is hereby corrected as shown below:

Column 5, line 19, "thereof The" should read --thereof. The--;

Column 7, line 8, claim 3, "filtering" should read --a filtering--; and

Column 8, line 37, claim 22, "consisting reinforcement" should read --consisting of reinforcement--.

Signed and Sealed this

Twenty-second Day of September, 2009

David J. Kappos
*Director of the United States Patent and Trademark Office*